US 7,483,914 B2

(12) United States Patent
Chang et al.

(10) Patent No.: US 7,483,914 B2
(45) Date of Patent: Jan. 27, 2009

(54) METHOD AND SYSTEM FOR IMPLEMENTING AN APPLICATION-BASED NAMING SYSTEM

(75) Inventors: David Yu Chang, Austin, TX (US); William Mitchell Edwards, Pflugerville, TX (US); Russell Ley Newcombe, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/621,902

(22) Filed: Jul. 17, 2003

(65) Prior Publication Data

US 2005/0015401 A1    Jan. 20, 2005

(51) Int. Cl.
*G06F 7/00* (2006.01)
*G06F 17/00* (2006.01)

(52) U.S. Cl. .................. 707/103 Z; 707/203; 707/102; 707/104.1; 717/120; 717/170; 717/175

(58) Field of Classification Search ................. 707/103, 707/102, 104.1, 203; 717/120, 170, 175
See application file for complete search history.

(56) References Cited

U.S. PATENT DOCUMENTS

| | | | | | |
|---|---|---|---|---|---|
| 5,377,323 A | * | 12/1994 | Vasudevan | .................. | 709/226 |
| 5,603,027 A | * | 2/1997 | Ohkami | ..................... | 707/200 |
| 5,745,683 A | * | 4/1998 | Lee et al. | ..................... | 709/250 |
| 5,787,431 A | | 7/1998 | Shaughnessy | ............... | 707/100 |
| 5,842,214 A | | 11/1998 | Whitney et al. | ............... | 707/10 |
| 5,964,816 A | | 10/1999 | Kincaid | ....................... | 701/45 |
| 6,098,111 A | | 8/2000 | Maegawa et al. | ........... | 709/300 |
| 6,256,031 B1 | | 7/2001 | Meijer et al. | ................ | 345/357 |
| 6,286,013 B1 | | 9/2001 | Reynolds et al. | ............ | 707/200 |
| 6,381,627 B1 | | 4/2002 | Kwan et al. | ................. | 709/201 |
| 6,442,685 B1 | | 8/2002 | French et al. | ............... | 713/100 |
| 6,480,508 B1 | | 11/2002 | Mwikalo et al. | ............ | 370/475 |
| 6,708,333 B1 | * | 3/2004 | Glerum et al. | ............. | 717/171 |
| 6,745,250 B1 | * | 6/2004 | Cocks et al. | ................ | 719/316 |
| 6,813,690 B1 | * | 11/2004 | Lango et al. | ................ | 711/118 |
| 2002/0065903 A1 | | 5/2002 | Fellman | ...................... | 709/220 |
| 2002/0116532 A1 | | 8/2002 | Berg | ......................... | 709/246 |
| 2002/0178254 A1 | | 11/2002 | Brittenham et al. | ......... | 709/224 |
| 2003/0182652 A1 | * | 9/2003 | Custodio | .................... | 717/122 |

(Continued)

OTHER PUBLICATIONS

"Tryex", http://tyrex.exolab.org/namlng.html, 1999.

*Primary Examiner*—Charles Rones
*Assistant Examiner*—Phuong-Thao Cao
(74) *Attorney, Agent, or Firm*—Hamilton & Terrile, LLP; Stephen A. Terrile

(57) ABSTRACT

A method is presented for processing names by a naming service. A naming service obtains an application name for an application along with at least one deployment attribute for a deployment of an instance of the application within a data processing system. The naming service generates an application-based name for the instance of the application; the application-based name represents a context within a naming system that is supported by the naming service, and the application-based name is a compound name that includes the application name and at least one deployment name for a deployment attribute. A deployment attribute is a metadata value, such as a deployment identifier or version identifier, that characterizes a manner in which the instance of the application is deployed within the data processing system.

1 Claim, 5 Drawing Sheets

U.S. PATENT DOCUMENTS

2003/0220933 A1* 11/2003 Blizniak et al. ............. 709/223
2003/0229888 A1* 12/2003 Spotswood et al. ......... 717/116
2003/0233451 A1* 12/2003 Ludvig et al. ............... 709/225
2004/0177358 A1* 9/2004 Narayanaswamy et al. . 719/310
2005/0015761 A1* 1/2005 Chang et al. ................ 717/174

* cited by examiner

METHOD AND SYSTEM FOR IMPLEMENTING AN APPLICATION-BASED NAMING SYSTEM

CROSS-REFERENCE TO RELATED APPLICATIONS

The present application is related to the following application with a common assignee, which is hereby incorporated by reference:

U.S. patent application Ser. No. 10/621,885, filed, Jul. 17, 2003, titled "Method and system for application installation and management using an application-based naming system including aliases".

BACKGROUND OF THE INVENTION

1. Field of the Invention

The present invention relates to an improved data processing system and, in particular, to a method and an apparatus for management of resources in a data processing system. Still more particularly, the present invention provides a method and an apparatus for implementing a naming system within a data processing system, particularly for supporting software execution, software management, software installation, and/or software deployment.

2. Description of Related Art

During execution, software programs require access to many different kinds of resources, such as an object, a document, a web page, a file, access to executable code in many different forms that are external to the executing software program, or some other type of computational or communicational function or data. In some instances, these resources are directly available to a software module through its supporting operating system. In other cases, an appropriate resource must be identified within a distributed data processing system.

In order to properly identify resources that have been distributed throughout a data processing system, various types of naming systems have been promulgated. While these naming systems address the need for a common methodology of identifying distributed resources, various problems arise with their methodologies, particularly with respect to the installation of applications within a distributed data processing system.

As a first example, a particular prior art naming system implements a single, shared, flat, namespace for all applications across a set of servers, but this naming system prevents the installation of the same application on multiple servers without changing a simple identifier for the application. For example, an application is often known by a simple identifier or name, and multiple instances of the application cannot be installed on multiple servers in this prior art naming system without providing different names for the different instances.

As a second example, a particular prior art naming system allows each server to have its own namespace region, and multiple instances of the same application can be installed across multiple servers. In this case, a given resource is addressed by specifying a fully qualified pathname to a server. However, the use of the topology of a distributed data processing system as part of a naming system causes certain usability problems. For example, when an application needs to be moved from one server to another server, then any references to the application, i.e., any instances of the use of the pathname for the application within the distributed data processing system, need to be updated to reflect the application's new server location.

Therefore, it would be advantageous to provide a method that allows application files to be identified without relying on a topology-based naming system.

SUMMARY OF THE INVENTION

A method is presented for processing names by a naming service. A naming service obtains an application name for an application along with at least one deployment attribute for a deployment of an instance of the application within a data processing system. The naming service generates an application-based name for the instance of the application; the application-based name represents a context within a naming system that is supported by the naming service, and the application-based name is a compound name that includes the application name and at least one deployment name for a deployment attribute. A deployment attribute is a metadata value, such as a deployment identifier or version identifier, that characterizes a manner in which the instance of the application is deployed within the data processing system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
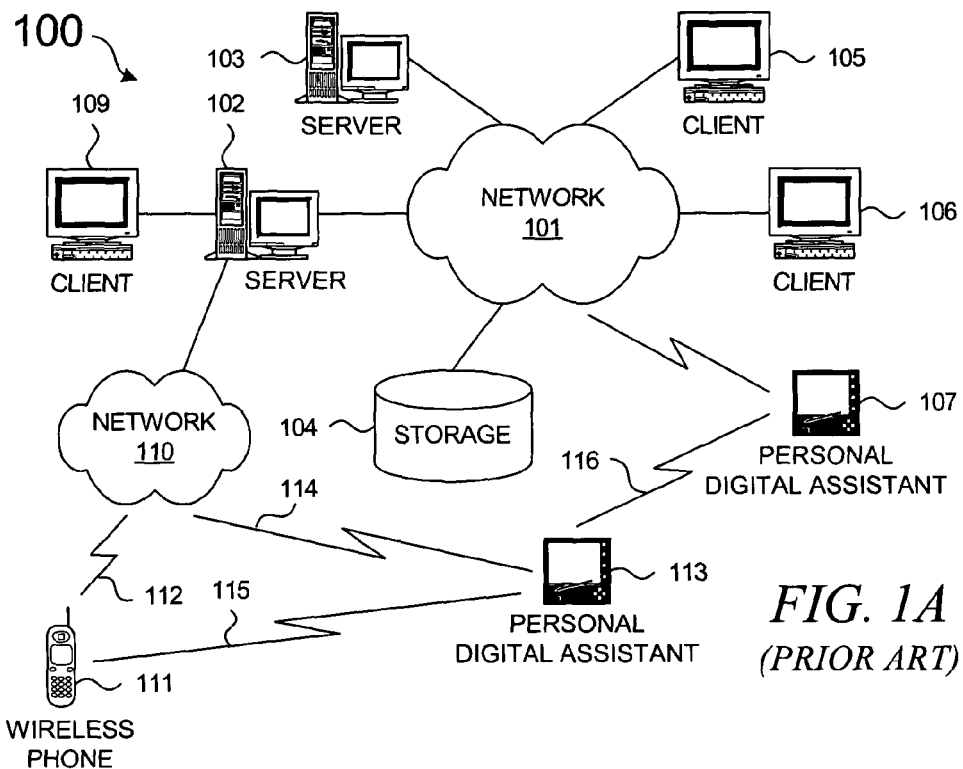
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
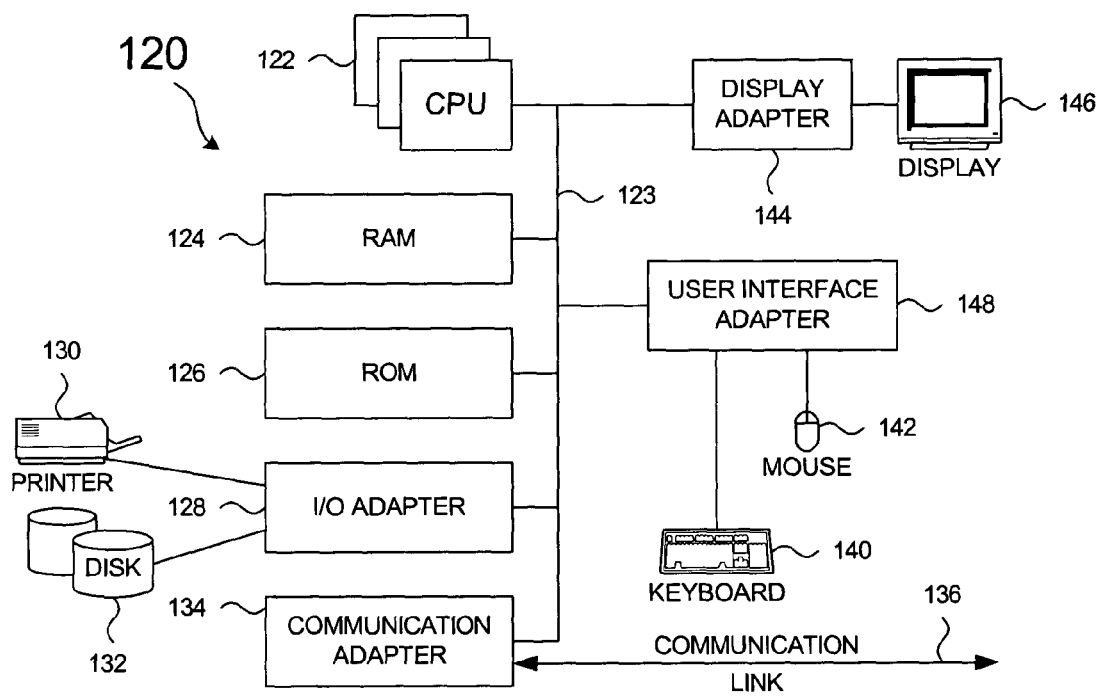
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved naming system, and in particular, an improved naming system for supporting the installation or deployment of applications and for a naming service for subsequent support in an execution environment for those applications.

Prior to describing the improved naming system of the present invention in more detail, a typical naming system is described, in particular, in accordance with the X/Open Federated Naming (XFN) Model, on which many naming systems are based. X/Open is an independent open-system organization that is supported by many other organizations and companies and that is dedicated to enhancing computing through practical implementations of open systems. X/Open defines a Common Applications Environment (CAE) in a set of specifications which include a set of application programming interfaces (APIs) that provide portability amongst application programs and which also include definitions of protocols to enhance interoperability of applications. The XFN specification fulfills a need for a standard naming system.

The present invention is compatible with the XFN naming model and similar naming systems and thus uses similar definitions as described within the XFN specification. A "naming convention" is a set of syntactic rules for generating a name. An "atomic name" is an indivisible component of a name as defined by the naming convention. A "compound name" represents a sequence of one or more atomic names composed according to the naming convention. For example, the pathname "/cell/nodes/node-name" is a compound name comprising a sequence of atomic names: "cell", "nodes", and "node-name"; the atomic names in a pathname are ordered left to right and are delimited by a special character, which is a slash character in this case. A naming convention enables the definition of functions for parsing any compound name, and the naming convention also determines equivalence amongst names.

The "reference" of an object contains one or more communication endpoints or addresses. A "binding" is an association of an atomic name with an object reference. In some cases, an object reference and the object to which it refers are used interchangeably. A "context" is an object whose state is a set of bindings with distinct atomic names. Every context has an associated naming convention. A context provides a lookup function, i.e., a resolution operation, which returns the reference bound to an object. An atomic name in one context object can be bound to a reference to another context object of the same type, called a "subcontext", thereby giving rise to compound names. For example, in the pathname "/cell/nodes/node-name", the atomic name "nodes" is bound in the context of "cell" to a context (and subcontext) in which "node-name" is bound. Resolution of compound names proceeds by resolving each successive atomic component in each successive context.

A "naming system" is a connected set of contexts of the same type, i.e., having the same naming convention, and providing the same set of operations with identical semantics. A "naming service" is the service that is offered to support an instance of a naming system; e.g., a naming service may be a set of APIs that provide the operations that are required to implement the syntactic rules for generating and manipulating names within the naming system. A "namespace" is the set of all names in a naming system, i.e., a namespace is an instance of a naming system. A "composite name" is a name that spans multiple naming systems.

A "federated naming system" is an aggregation of autonomous naming systems that cooperate to support name resolution of composite names through a standard interface. A "federated naming service" is the service that is offered to support an instance of a federated naming system. A "federated namespace" is the set of all possible names that are generated according to the policies that govern the relationships among member naming systems and their respective namespaces. A "naming system boundary" is the point where the namespace under the control of one member of the federation ends and where the namespace under the control of the next member of the federation begins. When one naming system is federated with another naming system, the naming system that is involved first during composite name resolution is the "superior" naming system; after resolution through the superior naming system, the next naming system is the "subordinate" naming system.

Figure 2:
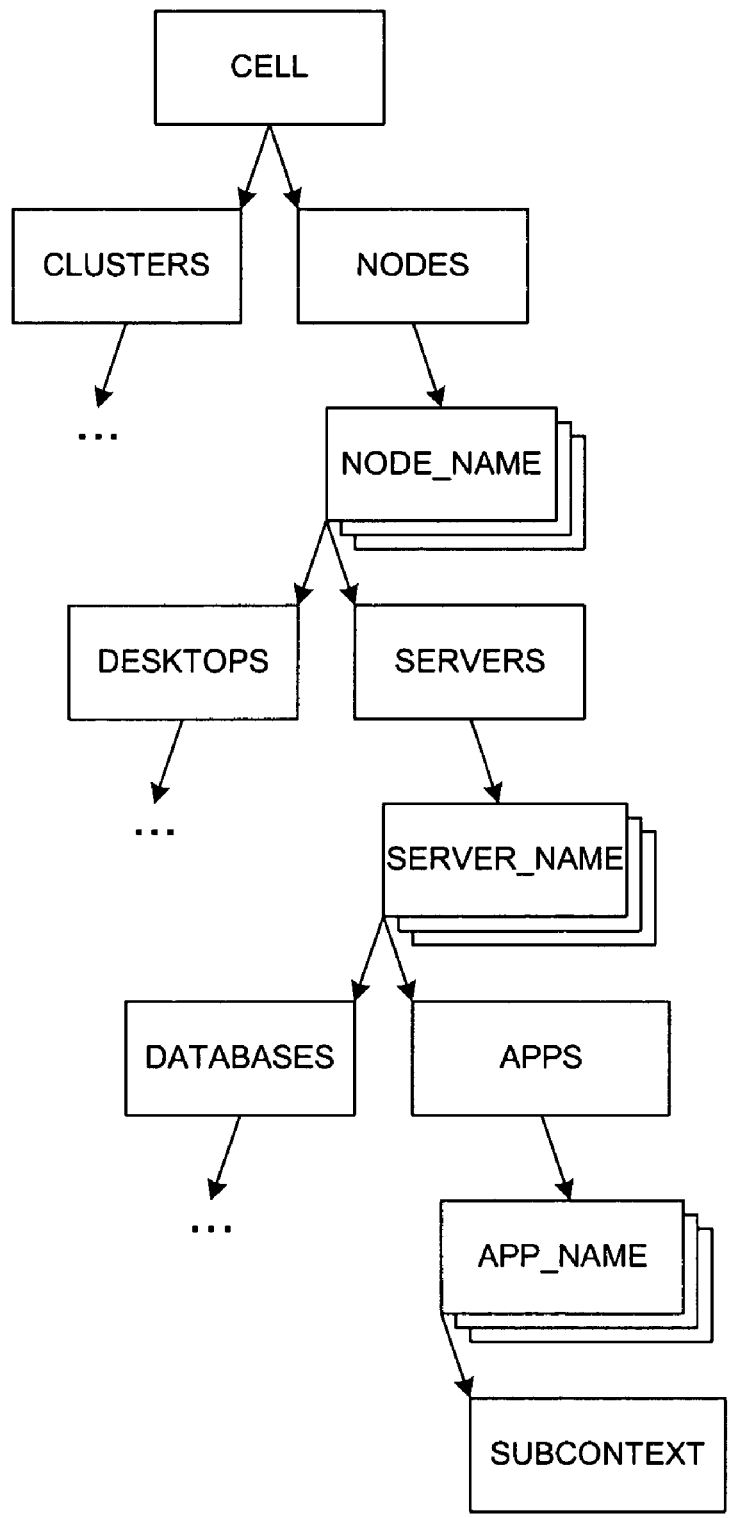
FIG. 2 depicts a block diagram that shows a representation of a typical topology-based naming system.
Figure 3:
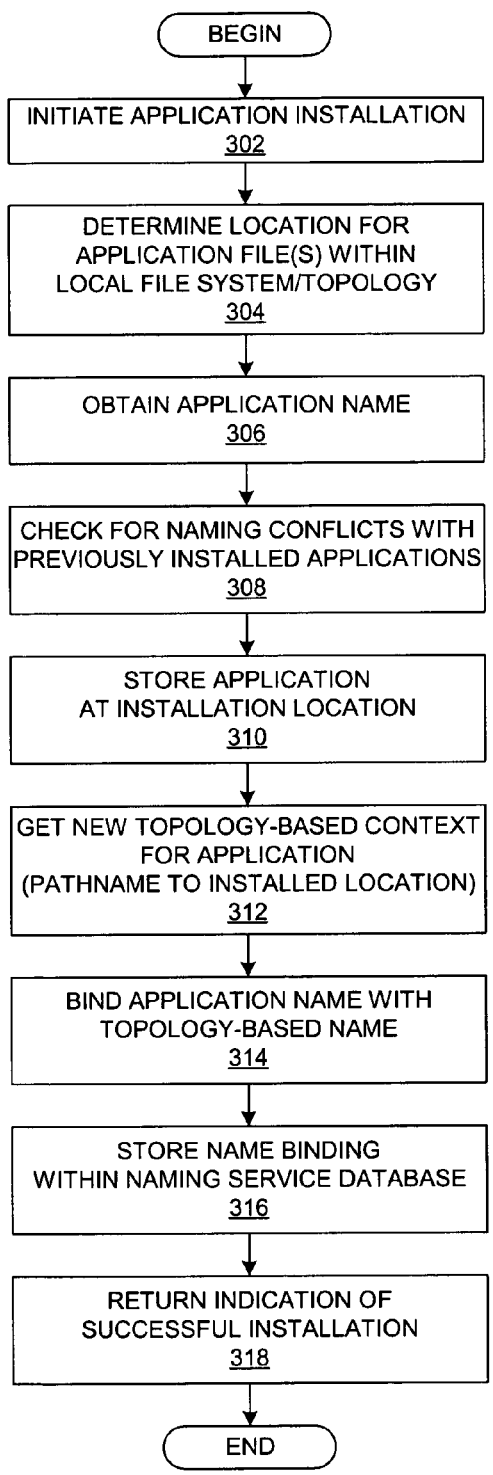
FIG. 3 depicts a flowchart that shows a typical operation for installing an application within a distributed data processing system that supports a topology-based naming system.
Figure 4:
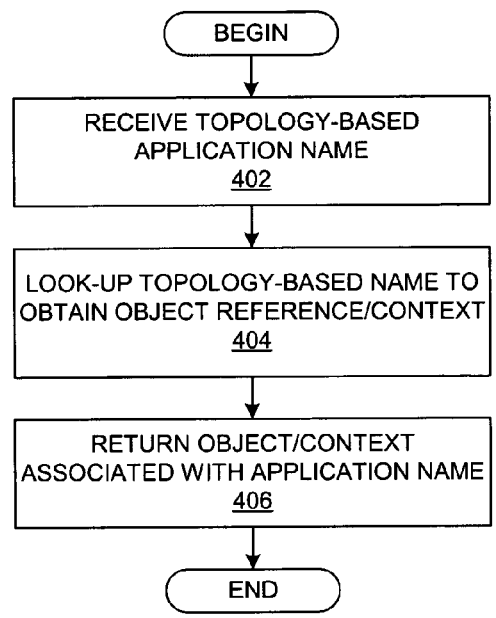
FIG. 4 depicts a flowchart that shows a typical operation for resolving an application name within a topology-based naming system.
Figure 5:
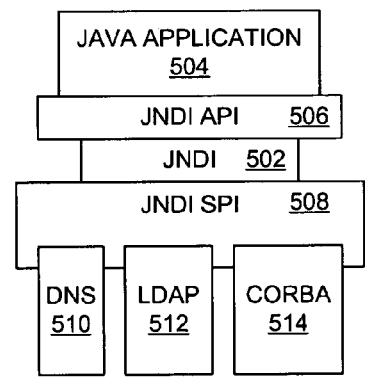
FIG. 5 depicts a block diagram that shows some of the logical components that are used in a typical Java environment to support multiple naming services.

Given the introduction above to naming system nomenclature, some additional background information is provided in FIGS. 2-5 prior to describing the naming system of the present invention in more detail, including a naming service that supports the improved naming system of the present invention. An example of a typical naming system is described with respect to FIG. 2. The description of FIG. 3 and FIG. 4 relates to typical operations for installing an application within a topology-based namespace and for resolving names within the topology-based namespace, respectively. The operations that are depicted in FIG. 3 and FIG. 4 are merely intended as examples of an interaction between a naming service and some other type of application. In addition, the depicted operations provide a basis for subsequent comparison between a typical topology-based naming system and a naming system that is implemented in accordance with the present invention. FIG. 5 provides a basis for a discussion of a naming system within a Java runtime environment.

Although a typical naming service supports many operations, e.g., for binding names, resolving names, removing bindings, renaming contexts, etc., the description of the present invention focuses on binding operations and resolving operations due to their important nature within a naming service. However, it should be noted that a naming service that is implemented in accordance with the present invention may provide a wide variety of naming-system-related operations in addition to binding operations and resolving operations.

With reference now to FIG. 2, a block diagram depicts a representation of a typical topology-based naming system. In the topology-based naming system that is shown in FIG. 2, the string "/cell/nodes/node_name/servers/server_name/apps/app_name/"

represents a fully qualified, topology-based name that represents a location within a local file system for an application that is named "app_name"; that is, the string represents a context within a topology-based naming system. As shown in FIG. 2, a context is like any other object within a naming system, and a context can also be bound to a name within a context. Binding contexts in other contexts creates a compound name. For example, "app_name" is one of a set of multiple names that have been bound within the context "apps"; "apps" and "databases" are two names that have been bound within the context "server_name"; "server_name" is one of a set of multiple names that have been bound within the context "servers"; "servers" and "desktops" are two names that have been bound within the context "node_name"; "node_name" is one of a set of multiple names that have been bound within the context "nodes"; "nodes" and "clusters" are two names that have been bound within the context "cell". In the example that is shown in FIG. 2, each server supports a set of database files and/or a set of application files; each node supports a set of desktops and/or a set of servers; and each cell supports a set of clusters and/or a set of nodes.

In addition, the example that is shown in FIG. 2 may depict a federated naming system with two naming system boundaries. First, a cell, which is a type of domain, may be a context within a wider topology-based naming system, e.g., a naming system that is supported by a naming service for a larger distributed data processing system, such as a wide area network. Second, depending upon the operating system support that is available, applications may be permitted to support their own contexts, i.e., subcontexts, e.g., to provide access to named resources that are controlled by individual applications.

With reference now to FIG. 3, a flowchart depicts a typical operation for installing an application within a distributed data processing system that supports a topology-based naming system. The operation that is depicted in FIG. 3 may be performed by an application installation utility, an application manager, or by some other form of system manager or system configuration utility.

The operation begins with the initiation of an installation operation for an application (step 302). After determining an appropriate location within the prospective topology for storing one or more application files associated with the application to be installed (step 304), the name of the application to be installed is obtained (step 306), and a check is performed to ensure that a naming collision or conflict does not arise between the name of the application to be installed and any previously installed applications (step 308). If a conflict did exist, then the conflict could be reported to alert an appropriate system administrator or user that is responsible for initiating the installation procedure. Assuming no naming conflicts exist, the application is stored at the chosen location within the distributed data processing system (step 310), e.g., the chosen location within a local file system.

After storing the application, the application undergoes a type of registration operation with respect to the naming service. A context for the chosen installation location within the topology-based naming system is obtained (step 312), e.g., a pathname within the local filing system, and the appropriate naming service is requested to bind the newly installed application name with the topology-based name (step 314). The name binding is stored within an appropriate naming service database (step 316), and an indication of a successful installation is returned to the installation utility or system management application (step 318), thereby concluding the installation procedure.

With reference now to FIG. 4, a flowchart depicts a typical operation for resolving an application name within a topology-based naming system. The resolution operation that is depicted in FIG. 4 may be performed by any application that has a need to perform some type of subsequent operation with respect to the application that is associated with the application name, e.g., a system management application or a peer application that needs to request access to a resource that is controlled by the application.

The resolution operation begins with the receipt of a topology-based application name by a naming service (step 402). The naming service then performs a lookup operation using the received topology-based name to obtain an appropriate data entity for the target application (step 404), such as an object reference or a context, thereby mapping the application name to its associated object. The appropriate data entity, e.g., a string, is then returned to the requester (step 406), thereby concluding the resolution operation.

With respect to FIG. 5, a block diagram depicts some of the logical components that are used in a typical Java environment to support multiple naming services. The Java Naming and Directory Interface (JNDI), shown as JNDI 502 in FIG. 5, is a standard interface for providing naming and directory functionality for applications that are written in the Java programming language, such as application 504.

The conceptual model for JNDI is based on the XFN naming model. According to the JNDI specification, naming and directory services play a vital role in intranets and the Internet by providing network-wide sharing of resources, and by using JNDI, Java applications can store and retrieve any type of named Java objects. In addition, JNDI provides methods for performing standard directory operations, such as associating attributes with objects and searching for objects using their attributes.

JNDI is defined independent of any specific naming or directory service implementation. It enables Java applications to access different, possibly multiple, naming and directory services using a common API. Different naming and directory service providers can be plugged in seamlessly behind this common API. This allows Java applications to take advantage of information in a variety of existing naming and directory services, such as LDAP and DNS, and allows Java applications to coexist with legacy applications and systems. Using JNDI as a tool, the Java application developer can build new powerful and portable applications that not only take advantage of Java's object model but are also well-integrated with the environment in which they are deployed.

Referring again to FIG. 5, JNDI 502 comprises JNDI API 506, which allows a Java application to access a variety of naming and directory services, and JNDI SPI (Service Provider Interface) 508, which enables a variety of naming and directory services to be integrated into the Java runtime environment, such as DNS (Domain Name System) service provider 510, LDAP (Lightweight Directory Access Protocol) service provider 512, and CORBA (Common Object Request Broker Architecture) service provider 514.

As mentioned above, the present invention is directed to an improved naming system, and in particular, an improved naming system for supporting the installation or deployment of applications and for a naming service for subsequent support in an execution environment for those applications. With respect to FIG. 5, a naming service that is implemented in accordance with the present invention may be plugged into a Java runtime environment in a manner similar to the other naming services that are shown in FIG. 5. The description of the present invention with respect to Java runtime environments is described in more detail further below.

As mentioned previously, the use of the topology of a distributed data processing system as part of a naming system may cause certain usability problems. In other words, the use of a topology-based name (or more generally, a topology-based naming system) has inherent limitations. The most visible problem is that, at a subsequent point in time after an application has been deployed, various references to the application may be made to the application using the application's topology-based name, e.g., the application's pathname. These references may be stored within databases or application/system management files, and depending on what occurs within the distributed data processing system at a subsequent point in time, these references may need to be updated, which may require significant modifications to many files along with significant bookkeeping efforts to ensure that all appropriate updates are made.

More specifically, topology-based names of particular applications are often stored within the resource files of other applications that invoke functions within those particular applications. For example, many runtime environments provide various types of resource files for an application. These resource files are meant to externalize the resource needs of an application such that resource names or resource references do not need to be stored within an application, i.e., hard-coded within an application. A resource file becomes a type of metadata description of the runtime requirements of an application after the names of its runtime resource requirements are stored in the resource file. If an application needs to invoke a function within a module of another application, this fact is stored within the invoking application's resource file. Typically, the invoked application's or invoked module's topology-based name is stored within the resource file. In this manner, the invoking application's runtime code makes a simple reference to its resource file, most likely using a simple logical name for the resource reference, and the runtime environment then provides a lookup operation for determining a more definite topology-based name, after which an object reference or other data item is used for runtime operations.

This methodology reduces the dependency of the source code of an application on its runtime environment, thereby reducing the likelihood that the source code of an application would need to be modified based on changes in its runtime environment. However, the dependency on topology-based names necessitates significant changes throughout the distributed data processing system if resources, particularly applications or application modules, are moved within the local topology. For example, when an application needs to be moved from one server to another server, then any references to the application, i.e., any instances of the use of the topology-based name for the application within the distributed data processing system, need to be updated to reflect the location of the application's new server.

Application-Based Naming System

In view of the background information that has been provided above for typical naming systems and assorted runtime components and considerations for the implementation of a typical naming system, a detailed description of the present invention is now provided. The present invention is directed to an improved naming system and to any runtime components that assist in the implementation of the improved naming system. More specifically, the present invention is directed to a novel application-based naming system rather than a topology-based naming system.

In the application-based naming system of the present invention, an application-based name is a compound name that comprises an application name and at least one deployment name. An application name is an atomic name that is associated with one or more instances of an application. A deployment name is an atomic name that is associated with a deployment attribute. A deployment attribute may include any metadata that characterizes the manner in which a particular instance of an application is deployed within a distributed data processing system. For example, a deployment attribute may characterize a series of versions of an application, each version being similar to each other yet differing in certain elements or features over a period of time. A deployment attribute may include: deployment identifier (ID), which may be a unique identifier associated with the deployment operation, wherein the identifier may be unique, for example, over all deployment operations within the distributed data processing system or over all deployment operations for versions or instances of a particular application; a version number/identifier or an edition number/identifier associated with a version of the application, e.g., a version number that increases over time to identify each iteration of improvements in a series of modifications to an application; or some other identifier for a deployment-associated characteristic or metric, such as a date on which the deployment was performed. The application-based naming system of the present invention is described in more detail below with respect to the remaining figures.

Figure 6:
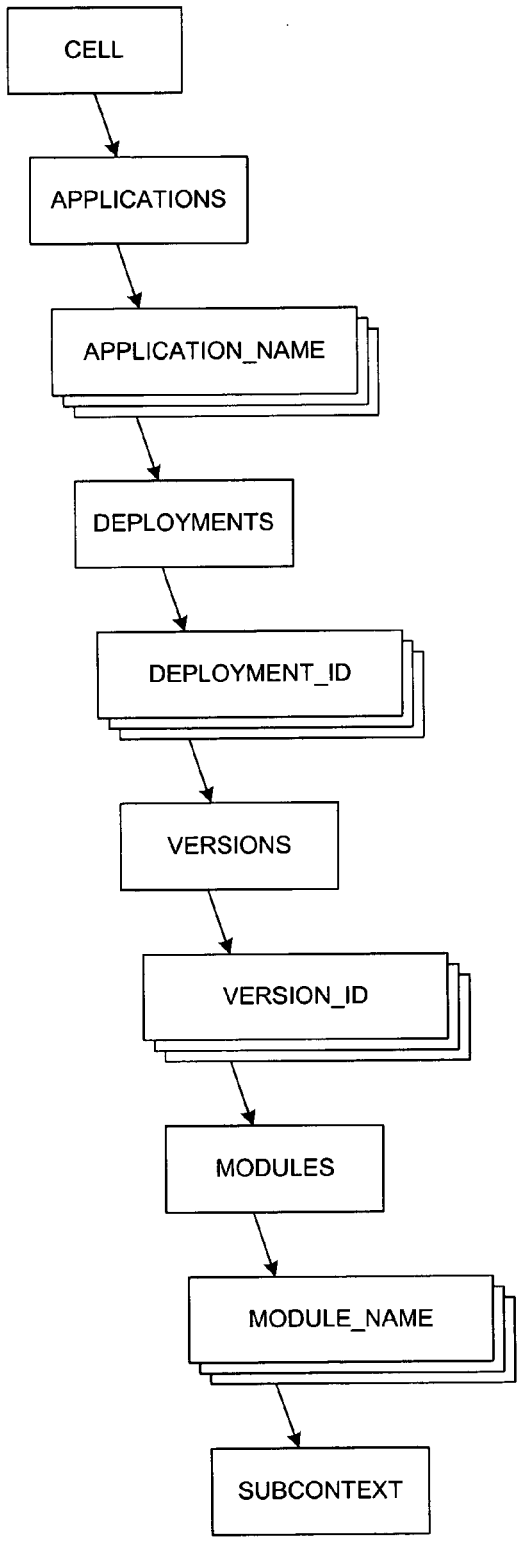
FIGS. 6 and 7 depict two different representations for an application-based naming system in accordance with the present invention.
Figure 7:
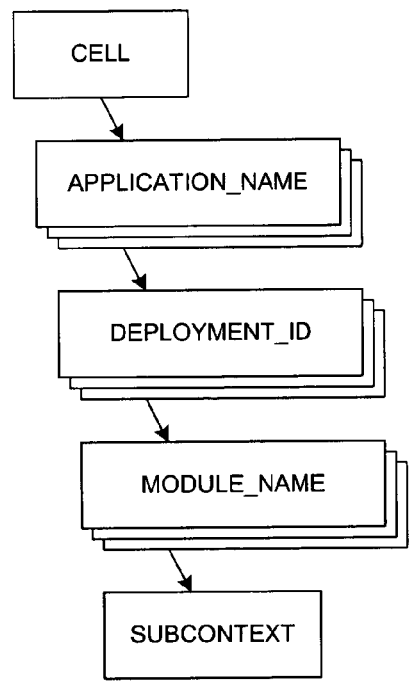

With reference now to FIGS. 6 and 7, block diagrams depict two different representations for an application-based naming system in accordance with the present invention. In the application-based naming system that is shown in FIG. 6, the string "/cell/applications/application_name/deployments/deployment_ID/versions/version_ID/modules/module_name/"

represents a fully qualified, application-based name for an application module having the module name "module_name"; that is, the string represents a context within an application-based naming system for a particular application module. A context in the application-based naming system is similar to the contexts that were described above with respect to the XFN model; binding contexts in other contexts creates a compound name.

In the example shown in FIG. 6, "applications", "deployments", "versions", and "modules" are constant or invariant context names, but they may be expanded to include variable names within a given context, e.g., for providing additional branches within a naming graph in the application-based naming system. In addition, "application_name" is one of a set of multiple names that have been bound within the context "applications"; "deployment_ID" is one of a set of multiple names that have been bound within the context "deployments"; "version_ID" is one of a set of multiple names that have been bound within the context "versions"; and "module_name" is one of a set of multiple names that have been bound within the context "modules".

The example that is shown in FIG. 6 may depict a federated naming system with two naming system boundaries. First, a cell may be a context within a superior naming system, e.g., a naming system that is supported by a naming service for a larger distributed data processing system. Second, depending upon the operating system support that is available, applications may be permitted to support their own contexts, i.e., subcontexts, e.g., to provide access to named resources that are controlled by individual applications. In this manner, the application-based naming system of the present invention is able to be federated with both superior and subordinate naming systems.

In the example that is shown in FIG. 6, an application is assumed to comprise multiple modules. However, in a different embodiment in which an application comprises a single module, there may be no need for a context that corresponds to application modules; in other words, in a different embodiment, the application-based naming system may conclude the naming graph after "deployment_ID".

Referring now to FIG. 7, an alternative application-based naming system is depicted in which the constant or invariant contexts "applications", "deployments", "versions", and "modules" are removed as compared with FIG. 6. In the example of FIG. 7, the string "/cell/application_name/deployment_ID/module_name/"

represents a fully qualified, application-based name for an application module having the module name "module_name"; that is, the string represents a context within an application-based naming system for a particular application module. As noted above, an application-based naming system that is implemented in accordance with the present invention supports compound names that comprise an application name and at least one deployment attribute, and in the example of FIG. 7, "deployment_ID" represents the minimum single deployment attribute within an application-based name; "version_ID" as part of an application-based name has been removed in the representation of FIG. 7 as compared with FIG. 6. In other embodiments of the present invention, additional deployment attributes may be included in an application-based name. Again, in FIG. 7, an application is assumed to comprise multiple modules. However, in a different embodiment in which an application comprises a single module, the application-based naming system may conclude the naming graph after "deployment_ID".

The following strings are some examples of application-based names that comprise a variety of deployment information. As is the case with any computer-related name, the names in these examples have meaning only within a given computational environment; in other words, the names in these examples would be valid only within a given data processing system. In other words, the names in these examples could be resolved or mapped to particular contexts or resources only within a given data processing system. Hence, it is noted that the explanation of the names in these examples necessarily incorporates information about a hypothetical data processing system that supports these names.

EXAMPLE 7-1

"/austin_TestBed/WebServ/Vers0-9-a/Lookup/"

In example 7-1, "austin_TestBed" refers to a context that acts as a root within an application-based naming system. This particular context organizes all application files for applications that are in a test phrase of their development by the Austin-based office of a particular enterprise. "WebServ" refers to a context that organizes all files relating to "WebServ", which is a particular application name for an application that is being developed by the enterprise. "Vers0-9-a" is a deployment attribute that has been used as a context that organizes all files that are related to a particular deployed version (version 0.9 alpha) of the "WebServ" application. "Lookup" refers to a context that organizes all files relating to a lookup module within the "WebServ" application, e.g., a set of dynamic link library (DLL) files or other types of executable files.

EXAMPLE 7-2

"/austin_TestBed/WebServ/Vers0-9-b/Lookup/"

Example 7-2 is similar to example 7-1 except that the deployment attribute in example 7-2 is set to "Vers0-9-b" compared to the deployment attribute of "Vers0-9-a" in example 7-1. In example 7-2, "Vers0-9-a" is a deployment attribute that has been used as a context that organizes all files that are related to a particular deployed version (version 0.9 beta) of the "WebServ" application.

EXAMPLE 7-3

"/server/serverX/DB2/2003Jan.1/"

In example 7-3, "server" refers to a context that acts as a root within an application-based naming system. This particular context organizes all servers of a particular enterprise. "serverX" refers to a context for a particular server. "DB2" refers to a context that organizes all files relating to "DB2", which is a particular application name. "2003Jan.1" is a deployment attribute that has been used as a context that organizes all files that are related to a particular deployment of the "DB2" application, e.g., the deployment of the application that occurred on the particular date.

EXAMPLE 7-4

"/server/serverX/DB2/2003Jul.1/"

Example 7-4 is similar to example 7-3 except that the deployment attribute in example 7-4 is set to "2003Jul.1" compared to the deployment attribute of "2003Jan.1" in example 7-2. In example 7-4, "2003Jul.1" is a deployment attribute that has been used as a context that organizes all files that are related to a particular deployment of the "DB2" application.

These deployment attributes, such as "Vers0-9-a" or "2003Jul.1", may originate from a variety of sources: from a system administrator; from a system management application that controls the deployment of applications; or from some other source.

Figure 8:
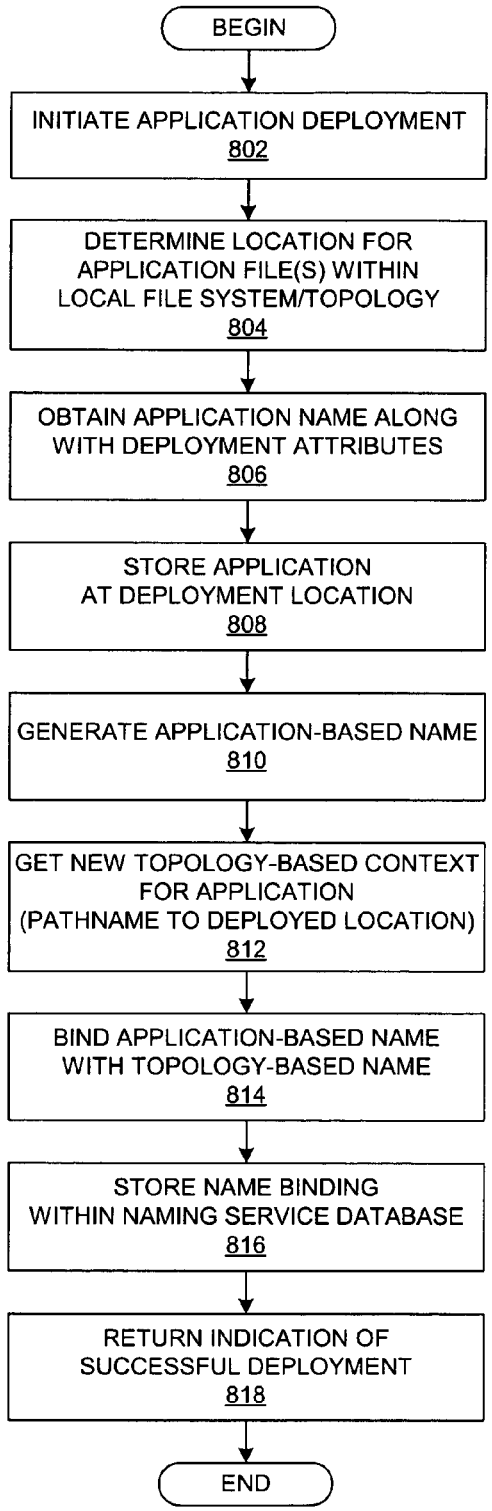
FIG. 8 depicts a flowchart that shows an operation for deploying an application within a distributed data processing system that supports an application-based naming system.

With reference now to FIG. 8, a flowchart depicts an operation for deploying an application within a distributed data processing system that supports an application-based naming system. The process that is shown in FIG. 8 is substantially similar to the process that is shown in FIG. 3 except that FIG. 8 shows the use of application-based names. The operation that is depicted in FIG. 8 may be performed by an application installation utility, an application manager, or by some other form of system manager or system configuration utility. The depicted operation is meant to illustrate merely one exemplary operation in which application-based names are used within a distributed data processing system.

The operation begins with the initiation of a deployment or installation operation for an application (step 802). After determining an appropriate location within the prospective topology for storing one or more application files associated with the application to be deployed (step 804), the name of the application to be deployed is obtained along with various deployment attributes associated with the application (step 806). The application name, deployment attributes, etc., may be retrieved from an application configuration file that would have been associated with the application or application module.

If appropriate, a check may be performed to ensure that a naming collision or conflict does not arise between the name of the application to be deployed and any previously deployed applications. If a conflict did exist, then the conflict could be reported to alert an appropriate system administrator or user that is responsible for initiating the deployment procedure. Assuming no naming conflicts exist, the application is stored at the chosen location within the distributed data processing system (step 808), e.g., the chosen location within a local file system.

After storing the application, the application undergoes a type of registration operation with respect to an application-based naming service. An application-based name is generated for the deployed application based on its application name and one or more deployment attributes (step 810). A topology-based context for the chosen deployment location within the distributed data processing system is obtained (step 812), e.g., a pathname within the local filing system, and the application-based naming service is requested to bind the application-based name of the newly deployed application with the topology-based name for the context in which it was deployed (step 814). The name binding is stored within an appropriate naming service database (step 816), and an indication of a successful deployment is returned to the deployment utility or system management application (step 818), thereby concluding the deployment procedure. It should be noted that the deployment operation that is shown in FIG. 8 depicts a single application file/module that is being deployed, but if an application comprises multiple modules, then the process that is shown in FIG. 8 would be repeated for each application module that is to be deployed, and each module name would also be used during the generation of the appropriate application-based name.

Figure 9:
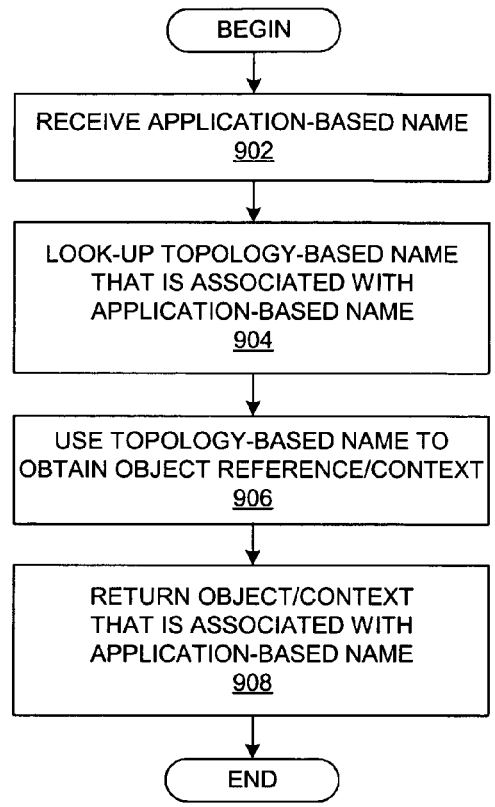
FIG. 9 depicts a flowchart that shows an operation for resolving an application-based name within an application-based naming system to a topology-based name for subsequent use within a distributed data processing system.

With reference now to FIG. 9, a flowchart depicts an operation for resolving an application-based name within an application-based naming system to a topology-based name for subsequent use within a distributed data processing system. The resolution operation that is depicted in FIG. 9 may be performed by any application that has a need to perform some type of subsequent operation with respect to the application that is associated with the application-based name, e.g., a system management application or a peer application that needs to request access to a resource that is controlled by the application.

The resolution operation begins with the receipt of an application-based name by a naming service (step 902). The naming service then performs a lookup operation using the received application-based name (step 904), thereby mapping the application-based name to its associated topology-based name. The topology-based name is then used to obtain an appropriate data entity for the target application (step 906), such as an object reference or a context, possibly through another service. The appropriate data entity is then returned to the requester (step 908), thereby concluding the resolution operation.

In this example, an application-based name provides a layer of abstraction or indirection over an topology-based name, which is then used within the runtime environment to obtain object references or other data. However, depending on the operating system and its dependence on the naming service, the application-based name may be able to be mapped directly to an object reference, context, or other appropriate data object for the result of the name resolution operation. In the case of resolving an application-based name for an application or for an application module, it is contemplated that the result of a resolution operation would be a context object for the server root wherein the application or the application module is deployed or installed. In this manner, the named resources of the application or the application module are relative to the server root context while still accessible through JNDI. If an application comprises multiple modules, each of the modules may map to different server root contexts.

The application-based naming system of the present invention provides numerous advantages for application and resource management over a topology-based naming system. With the present invention, application-based names are independent of the server topology within a distributed data processing system. Application-based names remain close to an application developer's view or a user's view of an application, i.e., an instance of an application is potentially only one instance of many deployed instances of an application within a distributed data processing system or potentially only one instance of many versions of an application.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for processing names by a naming service within a data processing system, the computer-implemented method comprising:

obtaining an application name that is associated with an application;

obtaining a deployment name that is associated with a deployment attribute that characterizes a deployment of an instance of the application;

generating an application-based name for the instance of the application;

storing the application-based name for the instance of the application, wherein the application-based name represents a context within a naming system;

the application-based name is a compound name that comprises the application name and multiple deployment names associated with multiple deployment attributes;

each of the multiple deployment attributes is a metadata value that characterizes a manner in which the instance of the application is deployed within the data processing system, each of the multiple deployment attributes is selected from a group comprising a deployment identifier, the deployment identifier being a unique identifier associated with the deployment operation, the deployment identifier being unique over all deployment operations within the data processing system or unique over all deployment operations for all instances of the application within the data processing system;

a version identifier or an edition identifier associated with a version of the application; and an identifier for a deployment-associated characteristic or metric;

binding the application-based name to a data object;

relating the data object to a context for an application server; and resolving the application-based name to a previously bound data object; and wherein an application comprises a plurality of application modules, each module being associated with a module name and each module being associated with an application-based name based on its module name.

\* \* \* \* \*